No. 620,796. Patented Mar. 7, 1899.
G. H. NEWELL & C. LINDBERG.
HAIR TRIGGER.
(Application filed Mar. 21, 1898.)

(No Model.) 3 Sheets—Sheet 1.

WITNESSES.
Harry J. Perkins.
Christopher Hondelink.

INVENTORS,
George H. Newell
Charles Lindberg
BY their ATTORNEY.
Edward Taggart

THE NORRIS PETERS CO., PHOTO-LITHO., WASHINGTON, D. C.

No. 620,796. Patented Mar. 7, 1899.
G. H. NEWELL & C. LINDBERG.
HAIR TRIGGER.
(Application filed Mar. 21, 1898.)
(No Model.) 3 Sheets—Sheet 2.
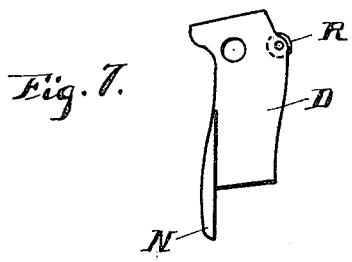
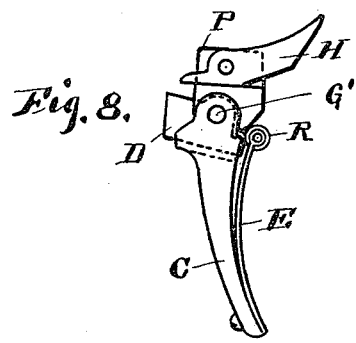
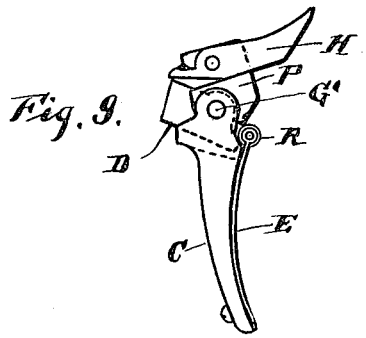
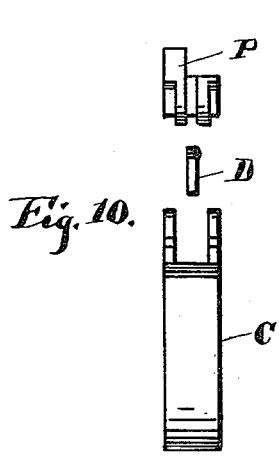
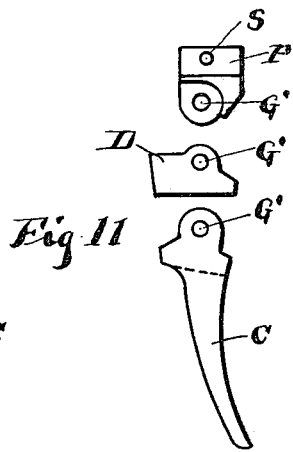
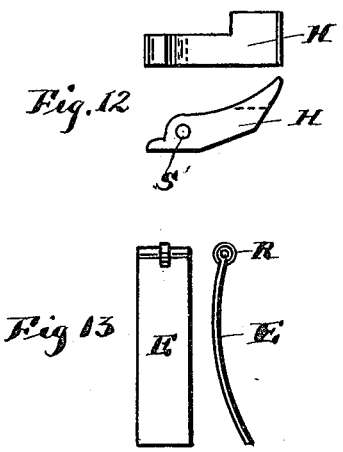
WITNESSES
Harry J. Perkins.
Christopher Hondelink
INVENTORS,
George H. Newell
Charles Lindberg
BY their ATTORNEY.
Edward Taggart No. 620,796. Patented Mar. 7, 1899.
G. H. NEWELL & C. LINDBERG.
HAIR TRIGGER.
(Application filed Mar. 21, 1898.)
(No Model.) 3 Sheets—Sheet 3.

WITNESSES. INVENTORS.
Harry J. Perkins. George H. Newell
Christopher Hondelink Charles Lindberg
BY their ATTORNEY.
Edward Taggart

UNITED STATES PATENT OFFICE.

GEORGE H. NEWELL AND CHARLES LINDBERG, OF GRAND RAPIDS, MICHIGAN, ASSIGNORS OF ONE-FOURTH TO JOHN WADDELL, OF SAME PLACE.

HAIR-TRIGGER.

SPECIFICATION forming part of Letters Patent No. 620,796, dated March 7, 1899.

Application filed March 21, 1898. Serial No. 674,680. (No model.)

*To all whom it may concern:*

Be it known that we, GEORGE H. NEWELL and CHARLES LINDBERG, citizens of the United States, residing at Grand Rapids, in the county of Kent and State of Michigan, have invented new and useful Improvements in Triggers, of which the following is a specification.

This invention relates to a new and improved hair-trigger for guns and pistols; and the invention consists in the combining with the trigger of a gun or pistol of a tripping-piece actuated by a spring so arranged that the gun may be discharged by the manipulation of the trigger proper or the tripping-piece may be set into position to discharge the gun by a slight pressure.

The objects of our invention are, first, to simplify the construction of hair-triggers; second, to form a hair-trigger which can be applied to any gun without changing any parts of the gun excepting the trigger, and, third, to combine in the most limited space a trigger and a hair-trigger. These objects we accomplish by means of the mechanism illustrated in the accompanying drawings, in which—

Figure 1:
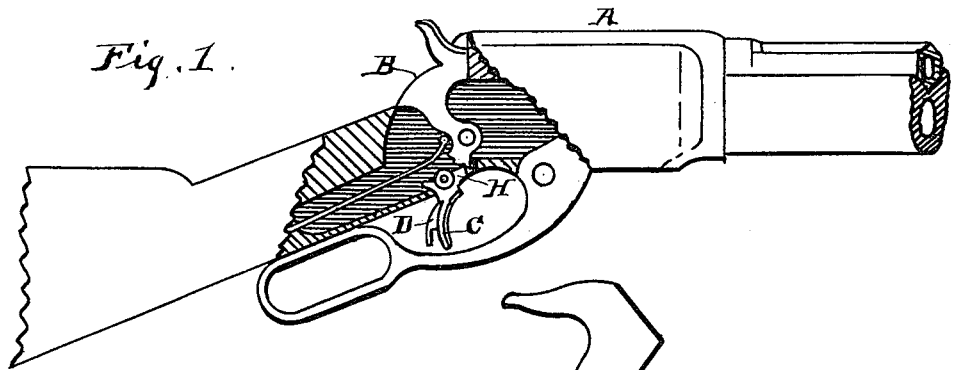
Figure 2:
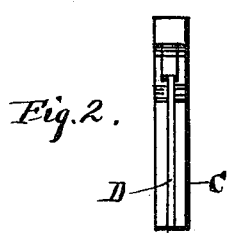
Figure 3:
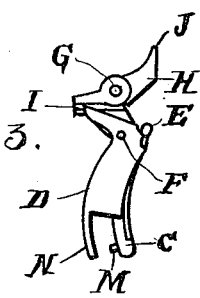
Figure 4:
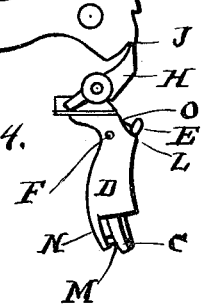
Figure 5:
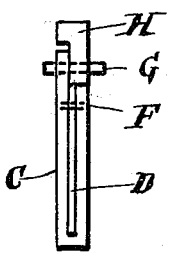
Figure 6:
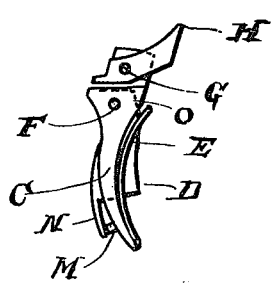
Figure 14:
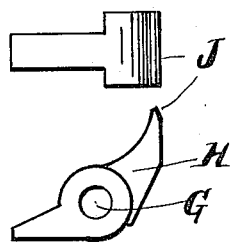
Figures 15, 16:
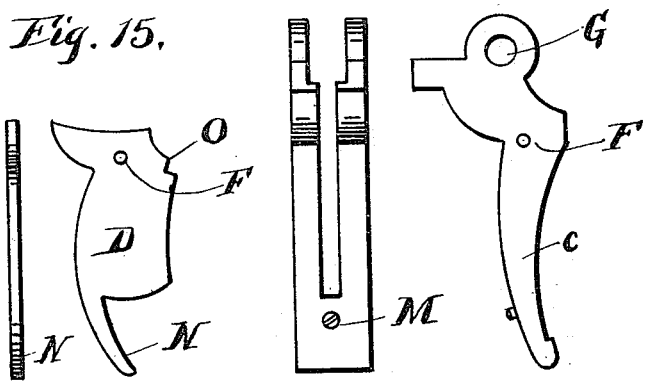
Figure 17:
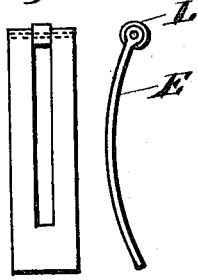

Figure 1 shows a side elevation of a gun having a portion broken away, showing the relative position of the hammer, the sear, the trigger, and the tripping-piece, the tripping-piece being set so as to be inoperative, leaving the gun in position to be discharged when the hammer is raised by means of the trigger proper and without the use of the tripping-piece or hair-trigger. Fig. 2 shows a rear elevation of the trigger and hair-trigger and sear. Fig. 3 shows a side elevation of the trigger, sear, and tripping-piece set out of operative position. It also shows the spring which operates the tripping-piece in section and a trigger in section. Fig. 4 shows a side elevation of the hammer, the sear, the tripping-piece with the spring, and the trigger in section. Fig. 5 shows a rear elevation of a modified form of the trigger, the tripping-piece, and sear. Fig. 6 shows a side elevation of the sear, trigger, and tripping-piece of the same construction as shown in Fig. 1 with the tripping-piece set in position to be used as a hair-trigger. Fig. 7 shows a side elevation of the tripping-piece detached and provided with a friction-roller. Fig. 8 shows a side elevation of a modified form having a block pivoted to the trigger and also pivoted to the sear with a short tripping-piece. Fig. 9 shows the same form as illustrated in Fig. 8 with the parts in the position they occupy after the trigger has been pulled. Fig. 10 shows a front view of the trigger, the tripping-piece, and the pivoted block, parts being detached. Fig. 11 shows a side view of the same parts. Fig. 12 shows a plan and side view of the sear detached. Fig. 13 shows a front and edge view of the spring provided with a roller. Figs. 14, 15, 16, and 17 are enlarged detailed views of the parts shown in Fig. 4. Fig. 14 shows a plan and side elevation of the sear. Fig. 15 shows an edge and side view of the tripping-piece. Fig. 16 shows a side and rear view of the trigger, and Fig. 17 shows a side and front view of the spring bearing the friction-roller.

Similar letters refer to similar parts throughout the various views.

A represents the gun-stock.

B represents the hammer, of the ordinary construction.

C represents the trigger proper, which turns upon the pivot G. In the first four figures the illustrations represent the form used in the Winchester rifles.

D represents the tripping-piece, which in the example of our invention illustrated in the drawings is pivoted to the trigger and has a downward extension and is adapted to work through a groove in the trigger, as shown in Fig. 2.

E represents the spring which operates the tripping-piece or hair-trigger. In the example of our invention shown in the drawings the spring E is secured to the front of the trigger and has a bearing upon the point or angle of the tripping-piece or part shown by O. This construction is fully illustrated in Figs. 4 and 6. Instead of attaching the spring to the front it may be attached in any position upon the trigger, provided the attachment is such that the tripping-piece D will be operated or thrown up in contact with the sear, hereinafter described, for the purpose of discharging the gun. The tripping-piece turns upon the pivot F, which pivot attaches the tripping-piece to the trigger.

H shows the sear, constructed in any ordinary manner, which also turns upon the pivot G and has what we term a "forward" projection J, which engages with the proper notch in the hammer. The position of the sear H and the projection J when the hammer is thrown back is illustrated in Fig. 4. The rear end of the sear, which projects some distance from the pivot G, receives a sudden blow or impact from the projection on the tripping-piece when the tripping-piece is thrown backward, as hereinafter described. In the example of our invention shown in Figs. 3 and 4 the upper end of the spring E (shown by L) is the one that bears upon the angle of the tripping-piece.

M is a regulating-screw or adjusting-screw which regulates the forward throw of the tripping-piece when the same is constructed as shown in the drawings, and N is the lower projection of the tripping-piece, which makes the engagement with M.

In the modified forms shown in Figs. 8, 9, 10, 11, 12, and 13 there is a block P, which is pivoted to the trigger C and forms a part thereof. It is pivoted to the trigger C by the same pivot which attaches the tripping-piece $D^2$. When the hair-trigger is set, as shown in Fig. 8, the roller R on the spring E is supported upon the inclined portion of the block P. By pulling back on the trigger slightly the roller moves off from the inclined portion of the block P and strikes the front end of the tripping-piece $D^2$, so as to throw its rear end up by a quick stroke against the rearward projection of the sear, thereby releasing the front end of the sear from the notch in the hammer, and thus causing the hammer to descend and discharge the gun. In the modified form the sear is provided with the pivot-hole S', which registers with the hole S in the block P and is secured thereto by means of a rivet. The block P is provided with a pivot-hole G', as is also the tripping-piece $D^2$ in the modified form, and the same pivot attaches the block P and the tripping-piece $D^2$ to the trigger.

The operation of our invention is as follows: When the tripping-piece is set in the position shown, the pulling on the trigger brings the rear portion of the trigger in contact with the rear projection of the sear, removing the projection J from the notch in the hammer, allowing the hammer to descend upon the cartridge and discharge the gun.

For ordinary use the trigger is used precisely the same as any trigger without a hair-trigger. When it is desirable to use the hair-trigger, the tripping-piece D is pushed forward from the position shown in Figs. 1 and 3 to the position shown in Figs. 4 and 6. By pulling backward upon this tripping-piece the spring E, above described, flies back suddenly, throwing the rear end of the tripping-piece suddenly upward, bringing the same into contact with the rear projection of the sear and withdrawing the point J from the notch in the hammer, allowing the same to descend and discharge the gun. This construction enables the user of the gun to utilize the tripping-piece or hair-trigger at pleasure or to use the gun without the hair-trigger.

A trigger constructed, as above described, with a tripping-piece may be readily applied to any ordinary gun without other change or modification of the weapon. It is simple in construction and effective in operation. The spring E may be applied to the front or rear of the trigger, its function being purely that of throwing the tripping-piece so as to bring the same into contact with the sear and release the hammer. This tripping-piece may be constructed as shown in Figs. 1, 2, 3, 4, 5, or 6 or as shown in the modified forms, and, as shown in Fig. 7, the friction-roller may be carried by the tripping-piece instead of by the spring.

We do not limit ourselves to the particular form of tripping-piece nor to its relative position to the trigger proper, as the invention consists in the combination, with a trigger, of a tripping-piece pivoted thereto and a spring carried by the trigger, which operates the tripping-piece to discharge the gun.

Having thus described our invention, what we claim to have invented, and desire to secure by Letters Patent, is—

1. In a gun or pistol, the combination of a trigger, a tripping-piece attached to the trigger, a spring borne by the trigger, said tripping-piece adapted to be thrown by said spring into contact with the sear for the purpose of releasing the hammer, substantially as described.

2. In combination with the trigger, a tripping-piece pivoted to said trigger adapted to be moved in or out of operation, a spring borne by the trigger acting upon said tripping-piece, a sear, a projection on the tripping-piece adapted to be thrown into contact with the sear when the tripping-piece is set in position for a hair-trigger, substantially as described.

3. In combination with a hammer, a sear engaging therewith, a trigger adapted to be brought in contact with the sear for the purpose of discharging the gun, a tripping-piece pivoted to the trigger adapted to be set into position to operate as a hair-trigger, a spring borne by the trigger and adapted to operate the said tripping-piece when said tripping-piece is manipulated or pressed upon for the purpose of discharging the gun, substantially as described.

4. In combination with a hammer, a sear engaging therewith, a trigger adapted to be brought in contact with the sear for the purpose of discharging the gun, a tripping-piece pivoted to the trigger adapted to be set into position to operate as a hair-trigger, a spring adapted to operate the said tripping-piece when the said tripping-piece is manipulated or pressed upon for the discharge of the gun, and a roller between the tripping-piece and spring, substantially as described.

5. In combination with a hammer, a sear engaging therewith having a rearward projection, a trigger adapted to be brought into contact with the said sear for the purpose of discharging the gun, a tripping-piece, a block pivoted to the trigger, said block supporting the sear, a spring secured to the trigger and held out of position by the block and adapted when the trigger is moved to be released from said block and come in contact with the tripping-piece for the purpose of discharging the gun, substantially as described.

6. In combination with a hammer, a sear engaging therewith, a projection on said sear, a trigger, a tripping-piece pivoted upon the said trigger, its free end having a backward and upward motion relatively to the trigger, a spring mounted on the trigger and bearing upon an angle of the tripping-piece, the free end of the tripping-piece adapted to be operated upon in order to bring the spring into operation to throw the tripping-piece in connection with the sear, thereby discharging the gun, substantially as described.

In testimony whereof we have hereunto set our hands in presence of two subscribing witnesses.

GEORGE H. NEWELL.
CHARLES LINDBERG.

Witnesses:
EDWARD TAGGART,
CHRISTOPHER HONDELINK.